(No Model.) 4 Sheets—Sheet 1.

A. H. CLARK.
THRASHER.

No. 291,151. Patented Jan. 1, 1884.

WITNESSES

INVENTOR (No Model.) 4 Sheets—Sheet 2.

A. H. CLARK.
THRASHER.

No. 291,151. Patented Jan. 1, 1884.

WITNESSES
INVENTOR (No Model.) 4 Sheets—Sheet 3.

A. H. CLARK.
THRASHER.

No. 291,151. Patented Jan. 1, 1884.

WITNESSES
E. Nottingham
George Cook.

INVENTOR
A. H. Clark.
B. A. Symons,
Attorney (No Model.)   4 Sheets—Sheet 4.

A. H. CLARK.
THRASHER.

No. 291,151.   Patented Jan. 1, 1884.

WITNESSES
G. F. Downing
George Cook

INVENTOR
A. H. Clark
By H. A. Symon
Attorney

UNITED STATES PATENT OFFICE.

ALEXANDER H. CLARK, OF FOND DU LAC, WISCONSIN.

THRASHER.

SPECIFICATION forming part of Letters Patent No. 291,151, dated January 1, 1884.

Application filed July 10, 1883. (No model.)

*To all whom it may concern:*

Be it known that I, A. H. CLARK, of Fond du Lac, in the county of Fond du Lac and State of Wisconsin, have invented certain new and useful Improvements in Thrashers; and I do hereby declare the following to be a full, clear, and exact description of the invention, such as will enable others skilled in the art to which it appertains to make and use the same.

My invention relates to an improvement in thrashers, the object of the same being to provide a device of this character which shall combine simplicity and economy of construction with durability and efficiency in use; and with this end in view my invention consists in certain details of construction and combinations of parts, as will be more fully described, and pointed out in the claims.

Figure 1:
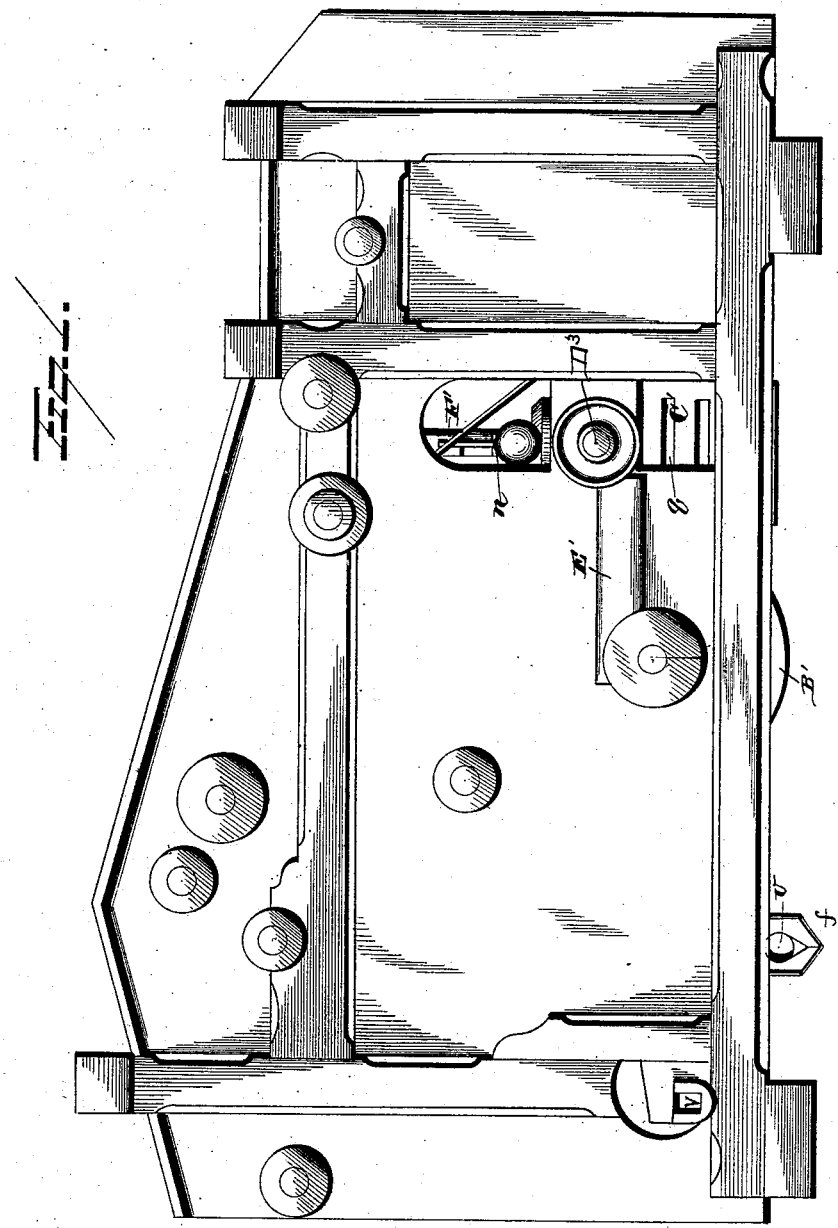
Figure 2:
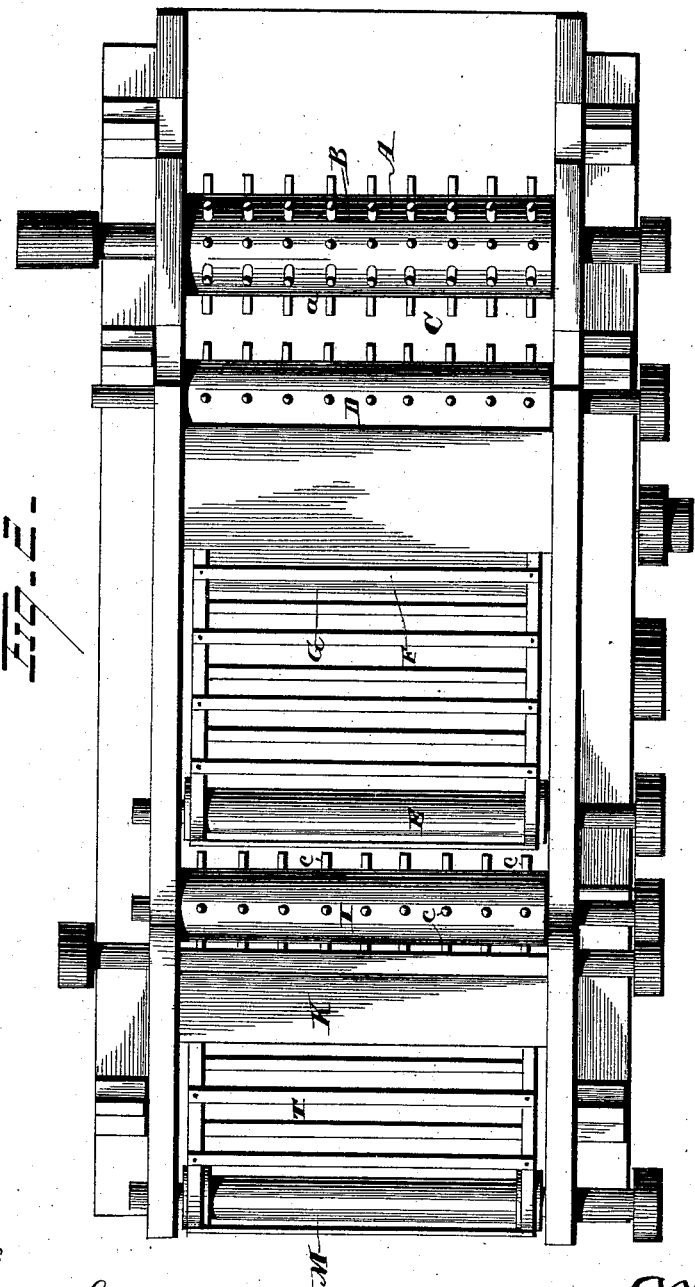
Figure 3:
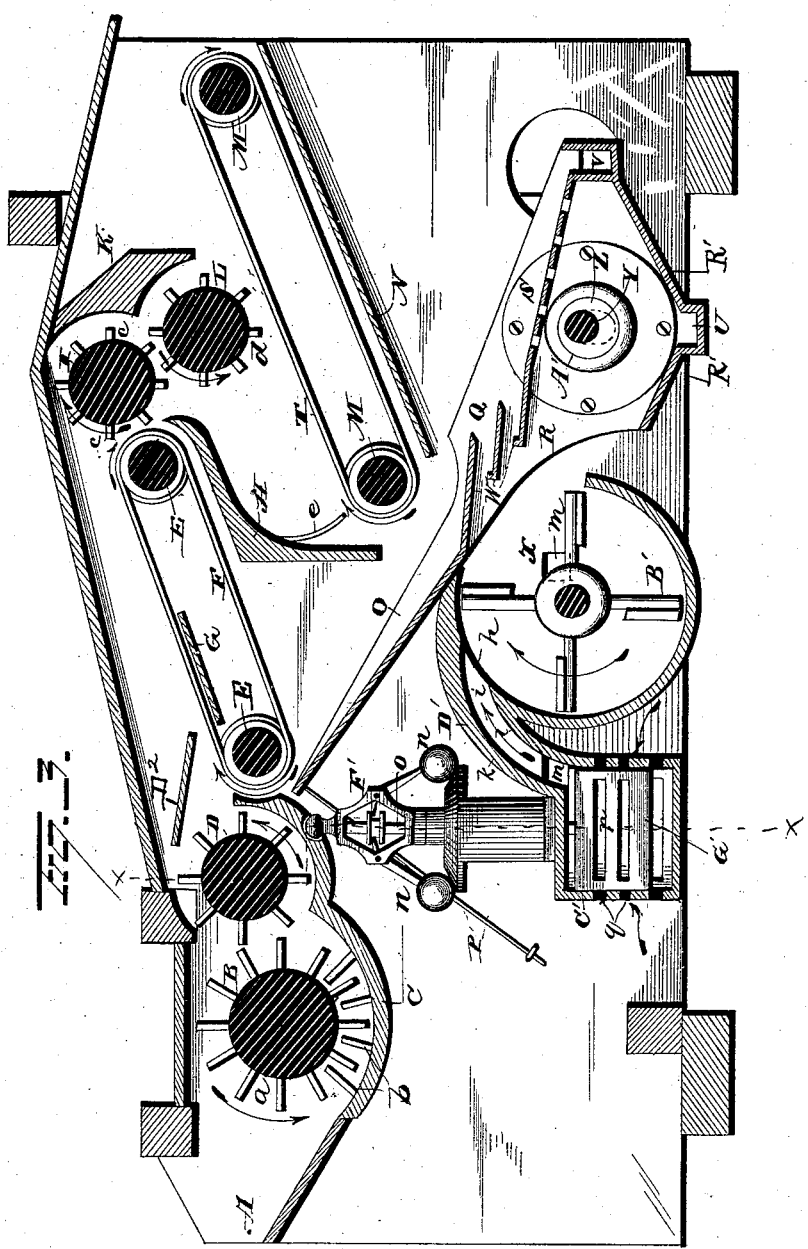
Figure 4:
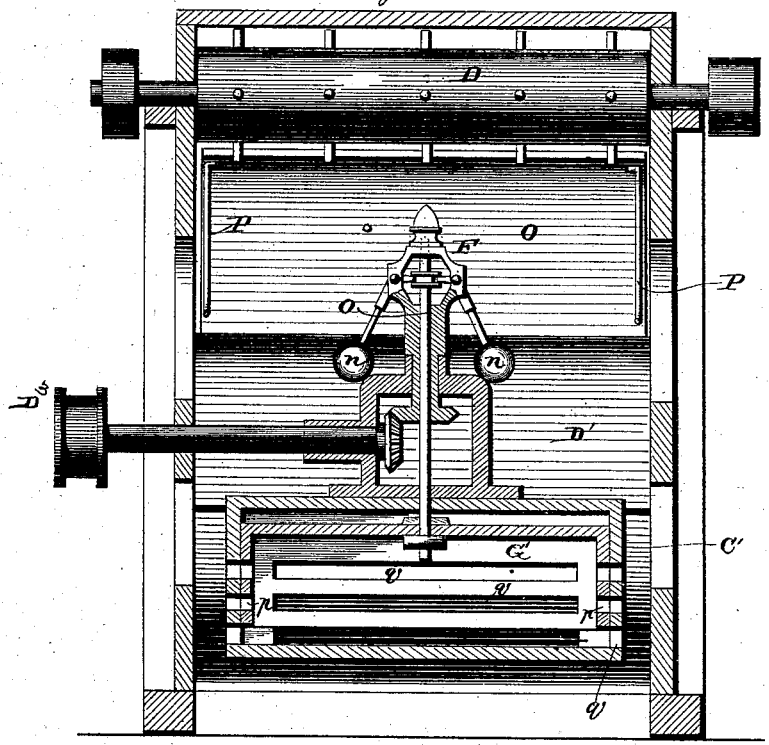

In the accompanying drawings, Figure 1 is a side view of my improvement. Fig. 2 is a plan view with the cover removed. Fig. 3 is a sectional view thereof, and Fig. 4 is a view in transverse vertical section on the lines $x$ $x$ of Fig. 3.

A represents the hopper which carries the straw to the cylinder B, the latter being provided with the teeth $a$, which mesh with the teeth $b$ of the double concave C, the first portion of the latter being located immediately below the cylinder C, the remaining portion being located near the picker D.

In the rear of and partly over the picker D is the deflector $D^2$, which latter is adapted to direct the straw onto the conveyer F, and prevent it from winding around the picker cylinder or shaft.

E E represent drums, around which passes the endless apron F, a chute, G, being placed between the two drums and nearer the forward one, which serves to deflect any loose grains on the sieve S.

Immediately below the rear drum E and the apron F is the deflector, chute, or incline H, which also serves to guide the loose grains to the sieve. The outside of this chute is preferably V-shaped, the inner portion being U-shaped, as shown in Fig. 3 of the drawings. This deflector is provided on its inner curved face with the depending curved teeth $e$, which are adapted to prevent the straw from leaving the front portion of the apron T, as will be hereinafter described.

To the rear of the chute or deflector H is the picker I, provided with the teeth $c$, said picker running in the direction as shown by the arrow. Behind this picker is secured the deflector K, against which the straw is adapted to strike and be turned downward.

Below the picker I is placed the picker L, also provided with teeth $d$, which mesh with the teeth $c$, the said picker L running in an opposite direction to that of the picker I.

M M represent two drums, around which revolves the endless conveyer or apron T, which moves in the direction indicated by the arrow. Beneath the apron T and on an equal incline therewith is placed the chute N, adapted to convey the grain to the sieve S, the latter being placed beneath the said apron.

O represents a chute, which is movably secured to the side of the machine by rods P, the lower end of the latter being secured to the side of the machine. The sides of this chute are continued downward, and, in connection with the two sides Q and bottom R', form the V-shaped shoe R, the said sides Q not quite meeting at the bottom, but being connected by the gutter U, which runs the whole length of the shoe, and is provided at one end with the spout $f$, from which issues the grain. The top of this shoe is provided with the sieve S, on which is adapted to be deflected the grain, all of the foul grain—such as cockle, &c.—falling into the gutter V, formed on the end of the shoe, and passing from thence into a separate receptacle.

Between the lower end of the chute O and the sieve S are provided the three steps W, the space between said steps being left open for the circulation of the draft created by the fan X. The bottom R' nearest the fan, not extending to the sieve, also allows the draft to circulate in the shoe and pass through the sieve S.

The lower end of the combined chute, sieve, and shoe is mounted as follows: Y represents the shaft journaled in bearings in the sides of the machine, and provided with the eccentrics Z, which are adapted to revolve in the bearings A', secured to the sides of the shoe.

When motion is applied to the shaft Y, the eccentrics Z, which are secured thereto, revolve in the bearings A', impart a vibrating or shaking movement to the sieve and shoe.

B' represents the fan-cylinder, in which is located the fan X, which latter revolves in the direction indicated by the arrow, the said cylinder being cut away near the shoe R, to allow the draft to pass the grain. This cylinder is also provided with an opening, h, to allow the passing of air from the chest C' to the fan, a portion of the top of the chest being also provided with openings for that purpose. The chest C' and cylinder B' are connected by the chamber D', formed by the sides i k l, which chamber conducts the air from said chest to the fan-cylinder.

Each side of the machine is provided with two openings, m, one registering with the end of the chamber D', the other with the cylinder B'. These openings on each side of the machine are connected by the air-passage E'. It will be readily seen that by this construction and arrangement of parts the air is conducted from the chest to the upper portion of the cylinder through the chamber D', and to each end of the cylinder through the passages E'.

F' represents a governor provided with the pivoted weighted arms n, adapted to raise or lower the stem o, said stem being provided on its lower end with the valve G', located within the chest C', and provided with the valve-openings p, which register with the openings q in the said chest when the weighted arms n are lowered and the stem o raised. The stem o is provided with a bevel-wheel, with which a similar bevel-wheel on the shaft D³ (shown in Fig. 4) meshes. This shaft is provided with a belt-pulley, which latter is connected by an endless belt with a suitable driving-pulley on the fan-shaft, whereby the governor-arms are caused to rotate when the machine is in motion. When the machine is running rapidly, the centrifugal force of the weight-arms n depress the stem o, and at the same time depress the valve, and thereby close the openings q in the chest C' in proportion to the speed of the fan; but when the fan is running slower and a greater quantity of air is needed, the arms n fall by gravity and raise the valve, and thereby uncover the openings in the chest.

From the above description it will now be seen that after the straw is fed to the machine through the hopper A, it is carried by the cylinder B to the picker D, by which it is thrown on the endless apron F, which conveys it to the picker I, during which operation all the loose grains drop on the chute G or H, and from there on the chute O and on the sieve S. The pickers I and L, revolving in opposite directions, as indicated by the arrows, in connection with the deflector K, carry the straw between the two pickers and deliver it on the conveyer T, which carries it to the rear of the thrasher, where it leaves the machine, the grain in the meantime falling on the different chutes and being conveyed to the sieve. The picker I, from the construction of the pulley attached to the end thereof, is adapted to revolve one-fourth faster than the apron F, and the picker L one-half faster than the picker I, the object of the same being to spread the straw thin as it is transferred, thereby giving the grain a better chance to drop from the straw as it progresses. The two pickers I and L, traveling in opposite directions, carry the straw back toward the front of the machine, thereby giving the straw a greater distance to travel before leaving the machine, and the grain a better opportunity to separate from the straw. As the grain travels down the chute O and falls from each of the steps W, the fan drives the blast between the said steps and separates the chaff and dirt from the grain and carries it out. This is also done while the grain is on the sieve, the blast entering the shoe and passing through the perforations in the sieve.

My invention is simple in construction, is of comparatively few parts, is effective in use, and can be manufactured at a small initial cost.

It is evident that many slight changes in the construction and relative arrangement of the different parts might be resorted to without departing from the spirit of my invention; and hence I would have it understood that I do not limit myself to the exact construction of parts shown and described, but consider myself at liberty to make such changes which may fairly be considered to fall within the spirit and scope of my invention.

Having fully described my invention, what I claim as new, and desire to secure by Letters Patent, is—

1. The combination, with two conveyers situated in planes of different elevations and lapping each other in the direction of travel, of two oppositely-revolving pickers situated in the rear of the upper conveyer and above the lower conveyer, and adapted to receive the grain from one conveyer and transfer it to the other, and the deflector K, situated in the rear of both pickers, substantially as described.

2. The combination, with two endless conveyers situated in planes of different elevations and lapping each other in the direction of travel, of two pickers running in opposite directions at different rates of speed, and adapted to take the straw from one conveyer and transfer it to the other, and the deflector K, substantially as described.

3. The combination, with the two conveyers, the two pickers acting therewith, and the deflector K, of a table or chute, N, situated below the lower conveyer, and a shoe situated below the chute, substantially as described.

4. The combination, with the two conveyers, two pickers, a deflector situated behind the pickers, and a deflector situated in front of them, of the chute or table N, and a shoe situated below the table or chute, substantially as described.

5. In a thrashing-machine, the combination, with a fan and fan-cylinder, of an air-chest, and means for conveying air from the chest to the front and each end of the cylinder, substantially as set forth.

6. In a thrashing-machine, the combination, with a fan and casing, of an air-chest, a valve, a governor, the stem of which is secured to the valve, and means for conveying the air from the chest to the front and to each end of the fan-casing, substantially as set forth.

7. The combination, with the combined chute, sieve, and shoe of the fan X and cylinder B', of the chest C', valve G', governor F', and chamber D', the above parts combined and adapted to operate substantially as described.

In testimony whereof I have signed this specification in the presence of two subscribing witnesses.

ALEXANDER H. CLARK.

Witnesses:
H. T. SACKETT,
JAMES T. GREENE.